United States Patent
Garrett et al.

(10) Patent No.: US 7,065,578 B2
(45) Date of Patent: Jun. 20, 2006

(54) SERVICE SELECTION IN A SHARED ACCESS NETWORK USING POLICY ROUTING

(75) Inventors: John W. Garrett, Neshanic Station, NJ (US); Charles Robert Kalmanek, Jr., Short Hills, NJ (US); Lawrence E. Murphy, Little Silver, NJ (US); Han Q. Nguyen, Marlboro, NJ (US); Kadangode K. Ramakrishnan, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 631 days.

(21) Appl. No.: 09/812,323

(22) Filed: Mar. 20, 2001

(65) Prior Publication Data

US 2002/0023171 A1    Feb. 21, 2002

Related U.S. Application Data (60) Provisional application No. 60/190,633, filed on Mar. 20, 2000, provisional application No. 60/190,636, filed on Mar. 20, 2000.

(51) Int. Cl.
*G06F 15/16*    (2006.01)

(52) U.S. Cl. ............... 709/229; 709/240; 709/241; 709/242

(58) Field of Classification Search ........... 709/238, 709/239, 240, 241, 242, 229
See application file for complete search history.

(56) References Cited

U.S. PATENT DOCUMENTS

| | | | |
|---|---|---|---|
| 5,914,938 A | 6/1999 | Brady et al. | |
| 5,918,019 A | 6/1999 | Valencia | |
| 5,959,990 A | 9/1999 | Frantz et al. | |
| 5,991,292 A | 11/1999 | Focsaneanu et al. | |
| 6,023,724 A | 2/2000 | Bhatia et al. | |
| 6,029,203 A | 2/2000 | Bhatia et al. | |
| 6,058,421 A | 5/2000 | Fijolek et al. | |
| 6,073,178 A | 6/2000 | Wong et al. | |
| 6,154,776 A | 11/2000 | Martin | |
| 6,163,807 A * | 12/2000 | Hodgkinson et al. | 709/229 |
| 6,240,091 B1 | 5/2001 | Ginzboorg et al. | |
| 6,263,369 B1 | 7/2001 | Sitaraman et al. | |
| 6,308,213 B1 | 10/2001 | Valencia | |
| 6,393,484 B1 | 5/2002 | Massarani | |
| 6,396,845 B1 | 5/2002 | Sugita | |
| 6,427,174 B1 | 7/2002 | Sitaraman et al. | |
| 6,438,100 B1 * | 8/2002 | Halpern et al. | 370/218 |

(Continued)

FOREIGN PATENT DOCUMENTS

WO    WO 98/24224    6/1998

(Continued)

OTHER PUBLICATIONS

Blankers, P., "Network Solution for Internet Access Service", *Ericsson Review*, (Jan. 1, 1998),4-13.

(Continued)

Primary Examiner—Jason Cardone
Assistant Examiner—Mitra Kianersi (57) ABSTRACT

It is an object of the invention to enable multiple services or service providers to share the facilities of an access network infrastructure providing physical connectivity to subscribers. A network access device advantageously may be used in communication network services with a service or service provider that is separate from the operator of the access network infrastructure.

15 Claims, 6 Drawing Sheets

U.S. PATENT DOCUMENTS

| | | | |
|---|---|---|---|
| 6,466,964 B1* | 10/2002 | Leung et al. | 709/202 |
| 6,484,210 B1 | 11/2002 | Adriano et al. | |
| 6,487,605 B1* | 11/2002 | Leung | 709/245 |
| 6,512,754 B1 | 1/2003 | Feder et al. | |
| 6,523,068 B1 | 2/2003 | Beser et al. | |
| 6,535,493 B1* | 3/2003 | Lee et al. | 370/329 |
| 6,556,584 B1 | 4/2003 | Horsley et al. | |
| 6,574,214 B1* | 6/2003 | Khalil et al. | 370/349 |
| 6,584,071 B1* | 6/2003 | Kodialam et al. | 370/238 |
| 6,603,758 B1 | 8/2003 | Schmuelling et al. | |
| 6,608,832 B1* | 8/2003 | Forslow | 370/353 |
| 6,633,761 B1 | 10/2003 | Singhal et al. | |
| 6,651,105 B1 | 11/2003 | Bhagwat et al. | |
| 6,708,187 B1 | 3/2004 | Shanumgam et al. | |
| 6,735,190 B1 | 5/2004 | Chuah et al. | |
| 6,789,118 B1* | 9/2004 | Rao | 709/225 |
| 6,850,521 B1* | 2/2005 | Kadambi et al. | 370/389 |
| 2001/0019557 A1 | 9/2001 | Hrastar et al. | |
| 2001/0044893 A1 | 11/2001 | Skemer | |
| 2002/0141418 A1 | 10/2002 | Ben-dor et al. | |
| 2002/0165972 A1 | 11/2002 | Chien et al. | |
| 2003/0039237 A1 | 2/2003 | Forslow et al. | |

FOREIGN PATENT DOCUMENTS

| | | |
|---|---|---|
| WO | WO 98/24224 A | 6/1998 |
| WO | WO 99/33211 | 7/1999 |
| WO | WO 99/33211 A | 7/1999 |
| WO | WO 99/52032 | 10/1999 |
| WO | WO 99/52032 A | 10/1999 |
| WO | WO 00/05684 | 2/2000 |
| WO | WO 00/05684 A | 2/2000 |

OTHER PUBLICATIONS

Perkins, C. E., "Using DHCP with Computers That Move", *Wireless Networks,* (Oct. 1, 1995),341-353.

International Search Report dated Jul. 19, 2001 regarding International Application No. PCT/US 01/08846.

International Search Report dated Jul. 19, 2001 regarding International Application No. PCT/US/01/08849.

International Search Report dated Jul. 19, 2001 regarding International Application No. PCT/US 01/08841.

Perkins, C. E., et al. "Using DHCP with Computers that Move", *Wireless Networks*, ACM, US. vol. 1, No. 3, Oct. 1, 1995, pp. 341-353, and pp. 342, left-hand col., line 22—p. 344, left hand col., line 25, document defining the general state of the art which is not considered to be of particular relevance.

Blankers P: "Network Solution for Internet Access Services" *Ericsson Review*, S. E., Ericsson, Stockholm, No. spec. int. Iss. 1998, pp. 4-13, figures 7, 8, p. 11, right-hand col., line 24-p. 12, left-hand col., considered to be of particular relevance.

International Search Report dated Jul. 19, 2001 regarding International Application No. PCT/US 01/08985.

International Search Report dated Jul. 19, 2001 regarding International Application No. PCT/US 01/08986.

International Search Report dated Jul. 19, 2001 regarding International Application No. PCT/US 01/08822.

* cited by examiner

```
401   interface cable x/y
402   ...
403   ip policy route-map source_route
404   ...
405   !

406   route-map source_route
407   match ip address isp1_subs
408   set ip next-hop isp1_next-hop_address
409   match ip address isp2_subs
410   set ip next-hop isp2_next-hop_address
411   ...
412   access-list isp1_subs permit isp1_prefix1
isp1_prefix1_wildcard any any
413   access-list isp1_subs permit isp1_prefix2
isp1_prefix2_wildcard any any
414   ...
```

SERVICE SELECTION IN A SHARED ACCESS NETWORK USING POLICY ROUTING

CROSS REFERENCE TO RELATED APPLICATIONS

This application claims priority to U.S. Provisional Application Ser. No. 60/190,633, entitled "INTERNET SERVICE SELECTION OVER CABLE," filed on Mar. 20, 2000, and to U.S. Provisional Application Ser. No. 60/190,636, entitled "QUALITY OF SERVICE OVER THE HFC CABLE PLANT," filed on Mar. 20, 2000, the contents of whick are incorporated by reference herein.

FIELD OF THE INVENTION

The present invention relates generally to communication network services, and, more particularly, to providing multiple services in a communication network.

BACKGROUND OF THE INVENTION

Customers of communication network services often desire access to a plurality of different services and different service providers. For example, when using a dial-up connection to a packet-switched data network such as the Internet, a customer can choose from multiple service providers by dialing different telephone numbers in the PSTN. The physical path from the customer to the customer's Internet Service Provider (ISP) is dedicated to the connection for the duration of the telephone call. The ISP assigns an IP address to the customer and can link the authenticated customer and the assigned IP address to the physical address (e.g. dial-up modem) used by the customer. With this linkage, the ISP can ensure the customer only uses the address authorized by the ISP and can use the customer's IP address to manage access to the ISP's services. The physical connection between a customer and the ISP, as well as the linkage to IP address assignment and customer authentication is terminated when the dial-up connection is terminated.

Constrained by the physical capacity of these temporary connections across the PSTN, many service providers are moving to high-speed access architectures (e.g., digital subscriber line (DSL), wireless, satellite, or cable) that provide dedicated physical connectivity directly to the subscriber and under the control of the ISP. These alternatives to shared access through the switched telephone network, however, do not lend themselves to shared access by multiple services and/or service providers.

SUMMARY OF THE INVENTION

It is an object of the invention to enable multiple services or service providers to share the facilities of an access network infrastructure providing physical connectivity to subscribers. In accordance with an embodiment of the invention, a router situated at an edge of an access network forwards packets to any of a plurality of packet-switched service networks. The router uses a policy based on the source address of the packets to determine to which service network to forward the packet. Each network access device is assigned a network address, which is associated with a particular service or service provider to which the user of the device is subscribed. The network access device advantageously may be used in communication network services with a service or service provider that is separate from the operator of the access network infrastructure.

In accordance with another aspect of the invention, interconnections between a plurality of packet-switched service networks and an access network are localized into managed access points. Routers in the access network can advantageously forward packets to the managed access points using conventional routing procedures, thus enabling the access network to provide "local" packet-switched services. The managed access points use source address-based policy to determine to which service network to forward a packet. Where a packet arrives at a managed access point that is not connected to the correct service network, the managed access point can use packet encapsulation or some other form of tunneling to redirect the packet to the correct managed access point. The present invention, among other advantages, does not require interconnection points to each service network at every regional access network site.

These and other advantages of the invention will be apparent to those of ordinary skill in the art by reference to the following detailed description and the accompanying drawings.

DETAILED DESCRIPTION

Figure 1:
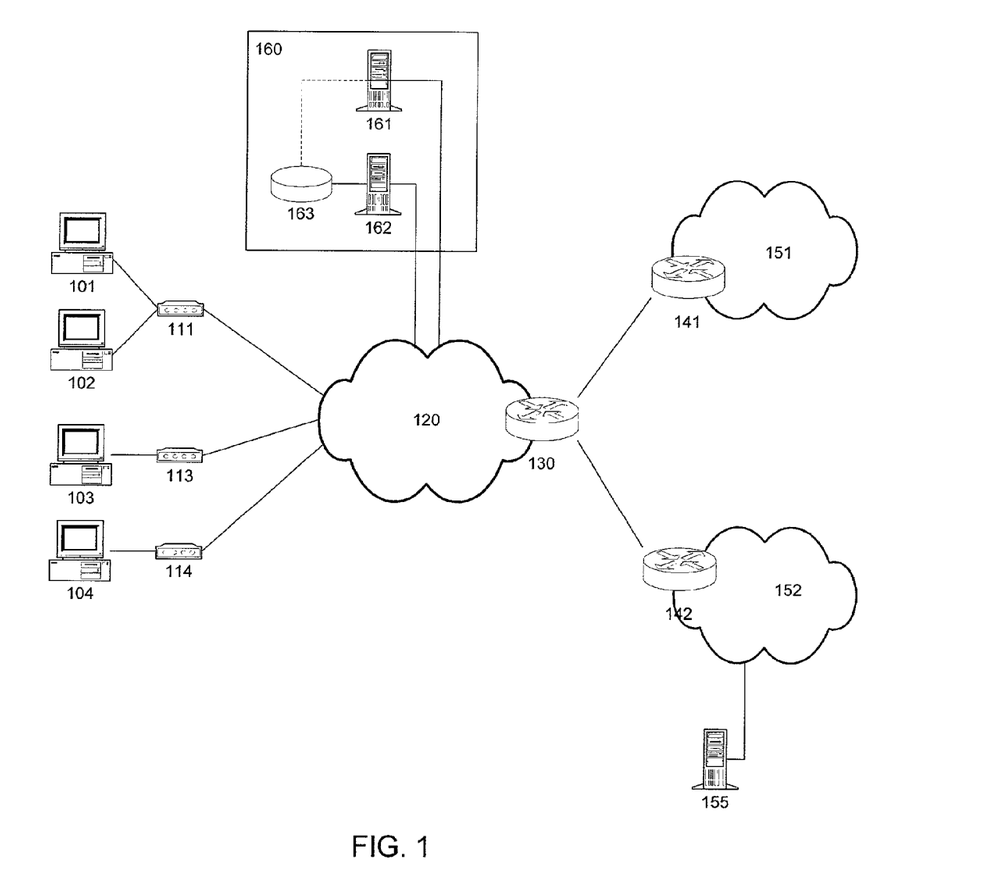
FIG. 1 illustrates an interconnection of packet-switched service networks and an access network embodying principles of the invention.

In FIG. 1, a plurality of subscribers operating network access devices 101, 102, 103, . . . 104 are provided access to communication network services, which are facilitated by a plurality of packet-switched data networks, shown in FIG. 1 as 151 and 152. Packet-switched data networks 151 and 152, referred to herein as "service networks," offer access to different services and/or are operated by different service providers. For example, service network 151 could provide packet-switched connectivity to public data networks while service network 152 could offer packet-switched telephony service (or the same public data network connectivity, but from a different service provider). The service networks, as is well known in the art, utilize a network addressing scheme to route datagrams to and from hosts: for example, where the service networks utilize the TCP/IP protocol suite, Internet Protocol (IP) addresses are assigned to each host and utilized in the process of routing packets from a source to a destination in the networks. See, e.g., "INTERNET PROTOCOL," IETF Network Working Group, RFC 791 (Sep. 1981); S. Deering, R. Hinden, "Internet Protocol, Version 6 (IPv6) Specification," IETF Network Working Group, RFC 1883 (Dec.1995), which are incorporated by reference herein. The described herein with particular reference to the TCP/IP protocol suite and IP addresses, although those skilled in the art would readily be able to implement the invention using any of a number of different communication protocols.

The network access devices 101 . . . 104 are typically customer premises equipment (CPE) such as a personal computer, information appliance, personal data assistant, data-enabled wireless handset, or any other type of device capable of accessing information through a packet-switched data network. Each network access device 101 . . . 104 is either connected to or integrated with a network interface unit 111 . . . 114, e.g. a modem, which enables communication through an access network infrastructure, shown as 120 in FIG. 1. Each network access device is assigned an IP address which, in accordance with an aspect of the invention, is associated with a particular service or service provider to which the user of the device is subscribed. For example, network access device 101 is assumed to have been assigned, for purposes of the description herein, an IP address associated with a service provider operating service network 151. As further described herein, it is advantageous to provide a service activation system 160 which advantageously permits the dynamic allocation, assignment, and reassignment of IP addresses to the plurality of network access devices based on customer subscriptions to particular services.

The network access device 101 communicates with the service network 151 through the access network infrastructure 120, which, in accordance with aspects of the invention, is capable of recognizing and directing traffic to the proper service network. The access network infrastructure 120 advantageously can be operated and maintained by an entity that is the same as or different from the entities operating and maintaining the service networks 151 and 152. In accordance with an embodiment of an aspect of the present invention, the different IP-based services offered by the different service networks 151 and 152 utilize shared layer one and layer two resources in the access network 120. Layer three routing procedures, however, are modified to permit IP traffic from network access device 101 to flow to the correct subscribed service network 151. The access network 120 has a router 130 on the edge of the access network. The router 130 has a first interface with a connection to a router 141 in service network 151 and a second interface with a connection to a router 142 in service network 152. As further described herein, the router processes packets and is capable of directing traffic to the proper service network.

Figure 2A:
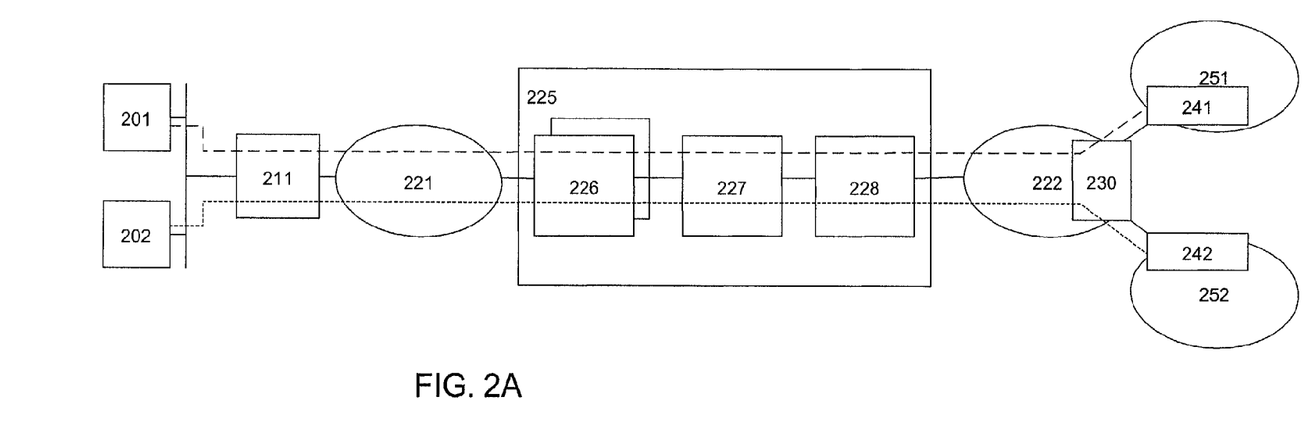
FIG. 2A and FIG. 2B is conceptual representation of an example embodiment illustrating principles of the invention based on an HFC access architecture with corresponding end-to-end protocol layers.
Figure 2B:
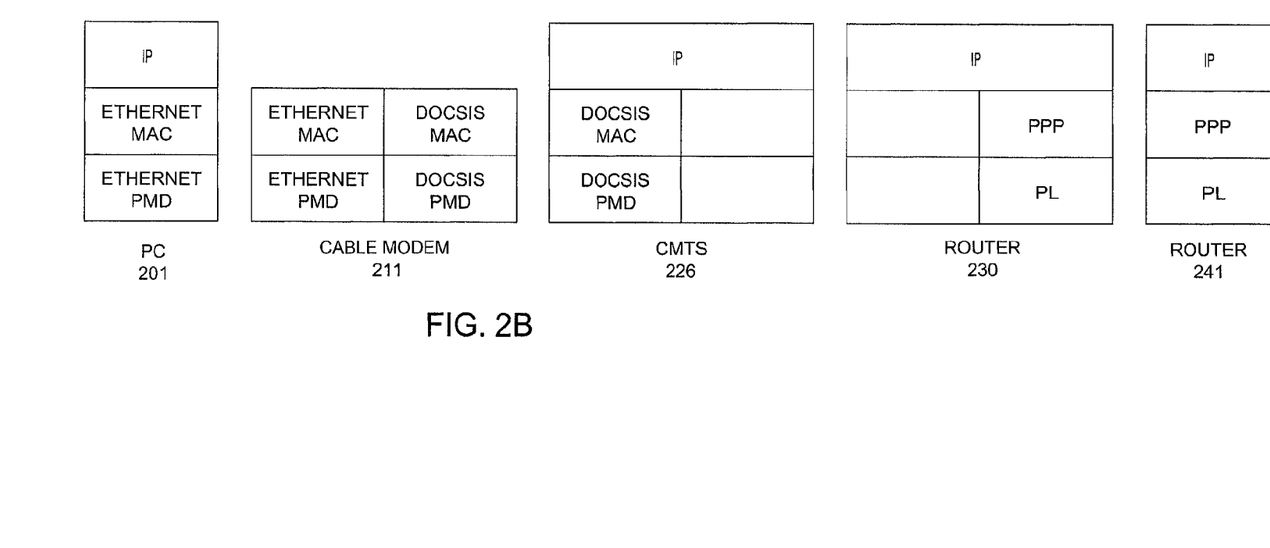

FIG. 2A shows an exemplary access architecture based on a hybrid fiber coaxial (HFC) access network. As is known in the art, each network interface device 201 . . . 202 is either connected to or integrated with a cable modem 211 which enables communication through the HFC network 221. In accordance with the Data Over Cable Service Interface Specification (DOCSIS), a Cable Modem Termination System (CMTS), shown as 225 in FIG. 2A, communicates with the cable modems 211 and manages access to both upstream and downstream cable capacity on the HFC networks 221. See, e.g., "Data-Over-Cable Service Interface Specifications: Cable Modem Termination System—Network Side Interface Specification," Cable Television Laboratories, Inc., SP-CMTS-NSI-I01-960702; "Data-Over-Cable Service Interface Specifications: Cable Modem to Customer Premise Equipment Interface Specification," Cable Television Laboratories, Inc., SP-CMCI-C02C-991015; "Data-Over-Cable Service Interface Specifications: Baseline Privacy Plus Interface Specifications," Cable Television Laboratories, Inc., SP-BPI+-I06-001215, which are incorporated by reference herein. The CMTS 225 manages the scheduling of both upstream and downstream transmission and allocates cable capacity to individual customers identified by a Service IDs (SIDs). The CMTS 225 can have an integrated router 228 or can be a separate device 226 that bridges to a fast Ethernet switch 227 which connects to the router 228. The IP router 228 provides connectivity to an IP network 222, which further comprises the router 230 (corresponding to router 130 in FIG. 1) which interfaces to IP routers 241 and 242 in service networks 251 and 252, respectively. Accordingly, the HFC network 221, the CMTS 225, and the IP network 222 correspond to the access network infrastructure 120 shown in FIG. 1. FIG. 2B shows a conceptual diagram of the end-to-end communication protocol stack from a network access device 201 (101) to a router 241 (141) in service provider's network 251 (151). As is known in the art, the lowest layer deals with the physical layer (PL) of the protocol stack, e.g. the Ethernet physical media device (PMD) layer; the second layer deals with the data link layer, e.g. the Ethernet Media Access Control (MAC) layer; and the third layer in the protocol stack deals with the network layer, e.g. the IP layer. The following aspects of the invention deal with modifications to routing processes in the network layer of the protocol stack.

Router 130 in the access network 120 in FIG. 1 (corresponding to IP router 230 in FIG. 2) separates the IP traffic to the multiple services or service providers as well as combines traffic from the multiple services or service providers. In accordance with an aspect of the invention, IP packets are routed from network access device 101 to the subscribed service network 151 using source address-based policy routing. Conventional routing is destination-based: the router consults an internal routing table which maps the destination addresses of all inbound packets to a physical interface address for use for outgoing packets. Policy routing schemes, however, will selectively choose different paths for different packets even where the packet's destination address may be the same. Since network access devices are assigned addresses associated with a particular network service provider, the source address based policy routing scheme ensures packets from a network access device will go to the appropriate service network. Conventional destination-based routing will ensure that packets addressed to a network access device will be routed to the appropriate service network. Note that this would require service providers to advertise their service address ranges to their peers.

Figure 3:
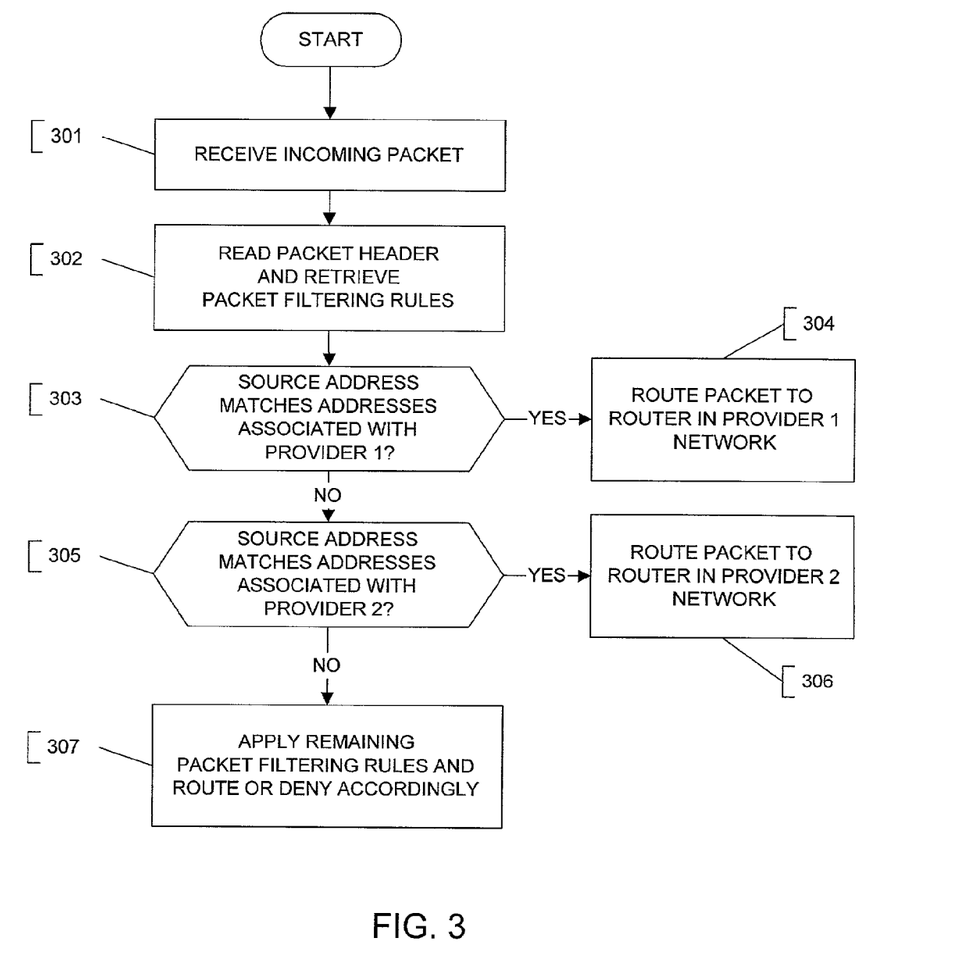
FIG. 3 is a flowchart of processing performed at a policy router, in accordance with an embodiment of the invention.

FIG. 3 sets forth the processing performed at a router in the access network, e.g. router 130 in FIG. 1. At step 301, the router receives an incoming packet. At step 302, the router reads the packet header and retrieves the packet filtering rules, typically stored in an access list as further described below. At steps 303, 305, and 307, the router applies the packet filtering rules. At step 303, the router compares the source IP address in the packet header to a list of addresses allocated to subscribers of services of a first service provider, e.g. operating service network 151 in FIG. 1. If the source address matches one of these addresses, then at step 304 the router forwards the packet to a router in service network 151, e.g. router 141 in FIG. 1. At step 305, the router compares the source IP address in the packet header to a list of addresses allocated to subscribers of services of a second service provider, e.g. operating service network 152 in FIG. 1. If the source IP address matches one of these addresses, then at step 305 the router forwards the packet to a router in service network 152, e.g. router 142 in FIG. 1. The router continues in this fashion with any other packet filtering rules identifying IP addresses allocated to subscribers of any other service providers. Assuming the IP source address does not match any such addresses associated with a service provider, at step 307, the router applies any remaining packet filtering rules and routes or denies the packet accordingly.

Figure 4:
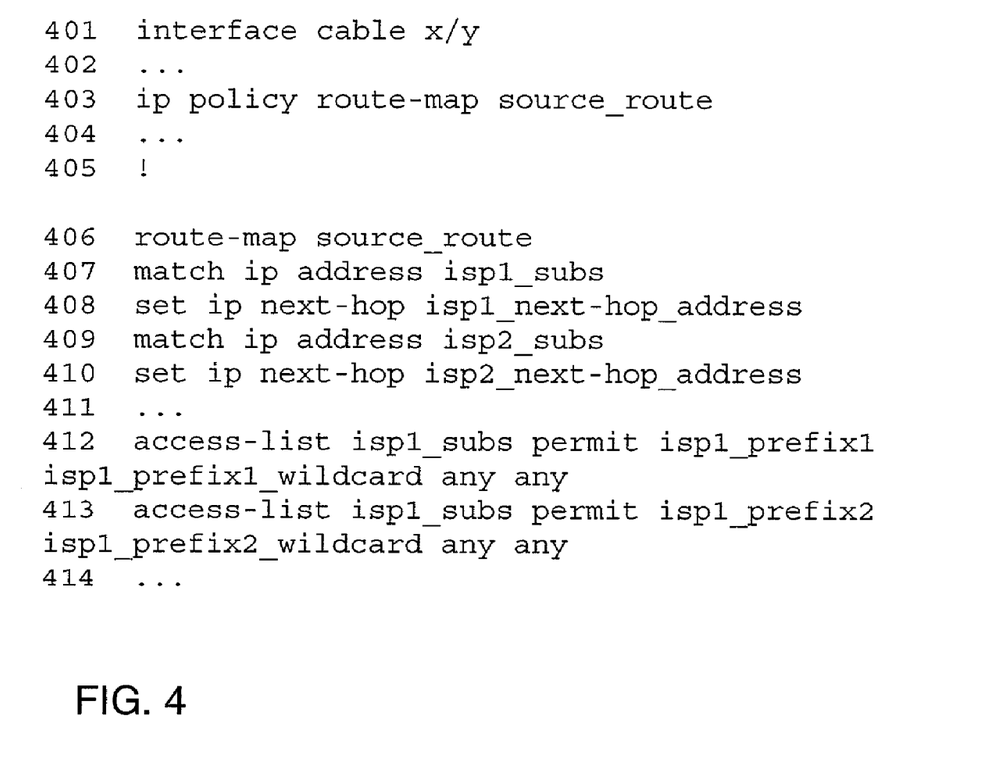
FIG. 4 is a simplified example of router configuration instructions.

FIG. 4 sets forth an example of router configuration instructions written for the Cisco Internetworking Operating System (IOS), which is used pervasively on conventional IP routers. Only the relevant portions of the configuration instructions are shown. Lines 401 to 405 configure the interface to utilize policy routing. Lines 406 to 410 specify the particular policy, namely to set the next "hop" address to the router address of a router in a one of the service networks, i.e. "isp1_next-hop_address," if the source address matches a range of addresses allocated to subscribers of the services provided by the service network, i.e. "isp1_subs." Lines 412 to 413 set forth access lists associating "isp1_subs" with ranges of addresses expressed, by convention, as a source address and a mask portion, i.e., the above policy is applied by the router to any traffic with a subscriber source address expressed as "isp1_prefix1" with a mask portion of "isp1_prefix_wildcard".

The embodiment shown in FIG. 1 notably requires interconnection points to all relevant service networks at each edge of each regional access network. In accordance with another aspect of the invention, it is desirable to create a regional transport network of routers and to localize the interconnection between the service networks and the access infrastructure into managed access points. A managed access point is a physical location at which the interfaces to the service networks can be provided. Having one or a small plurality of managed access points advantageously allows service selection to be implemented without requiring network service providers to connect physical facilities into, for example, every cable head end in an HFC-based network—thereby reducing costs for both the access network infrastructure operator and the service network providers. Each router in the regional transport network can be configured with policy information and invoke source address routing to forward packets to the managed access point providing access to the relevant service network. By overriding normal routing procedures, however, these procedures may introduce potential routing loops absent significant coordination between the routers external to known routing protocols. This risk can be minimized by centralizing the policy routing function in a single router that provides the interfaces to the service networks.

Figure 5:
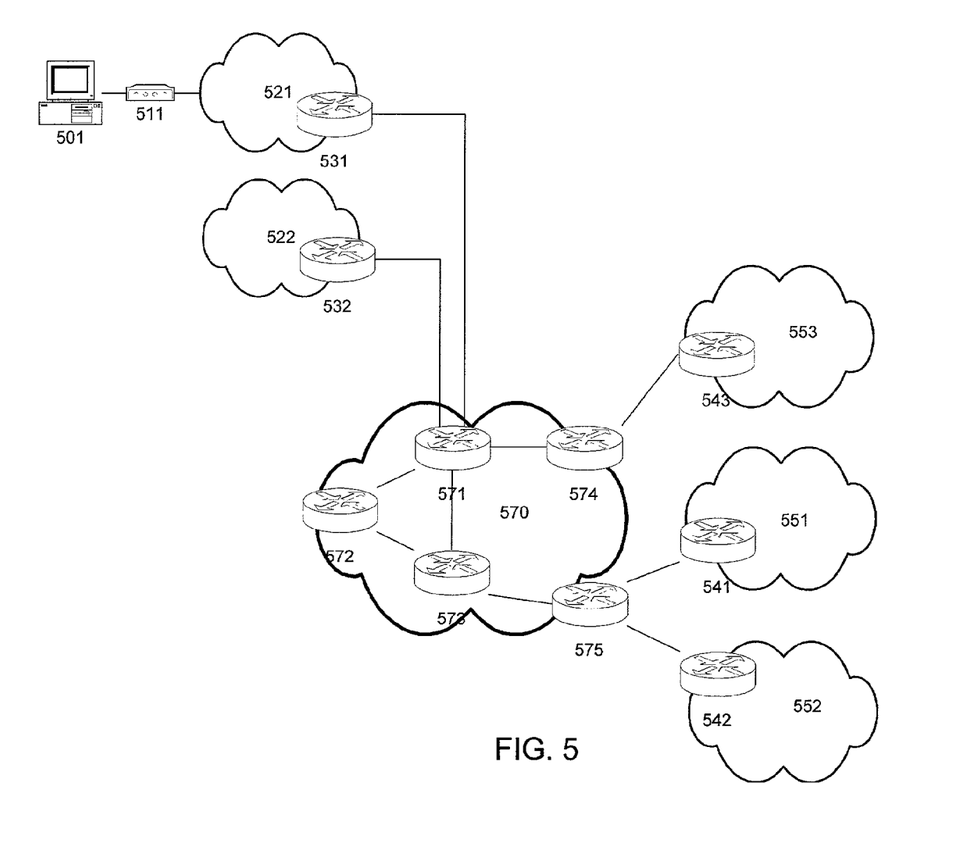
FIG. 5 illustrates an interconnection of packet-switched service network, regional access networks, and a packet-switched access network, embodying principles of another aspect of the invention.

FIG. 5 illustrates an embodiment of this aspect of the invention. Each network access device 501 is connected through a network interface unit 511 to one of a plurality of access networks, e.g. 521 and 522 in FIG. 5. Each access network has an edge router (531 and 532 respectively in FIG. 5) which connects the access network to a regional IP network of routers, represented abstractly in FIG. 5 as IP access network 570. It is advantageous to aggregate connections from groups of edge routers to a single aggregation router 571 in the IP access network 570, as shown in FIG. 5. Aggregation router 571 can then connect to other routers in the regional IP network 570, i.e. routers 572 . . . 573, which can also be aggregation routers connecting to pluralities of edge routers. Routers 541, 542, . . . 543 in service networks 551, 552, . . . 553 connect to the IP network 570 at routers 574 and 575, which act as managed access points to the service networks. Only the managed access point routers, e.g. 575, need invoke policy routing based on packet source address. All intermediate routers within the IP access network 570, i.e. 571 . . . 573, use normal destination-based forwarding procedures for destinations that are not local to the network 570. No configuration of policy in the intermediate routers is necessary.

By locating the policy routing functions at the interfaces to the service networks, the access network infrastructure (whether reflected generally by 120 in FIG. 1 or, in the packet-switched context, as network 570 in FIG. 5) can provide access to "local" services available from within the access network infrastructure. For example, IP network 570 can provide access to "local" packet-switched services and operate independent of the source address assigned to the network access devices. Since the intermediate routers 571 . . . 573 all use conventional destination-based forwarding, network 570 will properly route local service packets along the correct routing paths. "Non-local" service packets, however, are routed towards the managed access point routers 575 and 574 and policy routed to the correct service network. Where the network 570 forwards to a single managed access point router or where each managed access point router has a connection to each service network, the managed access point router can forward packets in accordance with the policies described above. Where, however, there are service networks that connect to only a subset of the managed access points (e.g., in FIG. 5, where service network 553 only connects to managed access point router 574), packets can be redirected or "tunneled" to the correct managed access point in order to ensure that the packets arrive at the correct service network. The multiple interconnected managed access points can then provide a single "logical" inter-domain gateway, again permitting all other routers to use conventional destination-based routing procedures.

Figure 6:
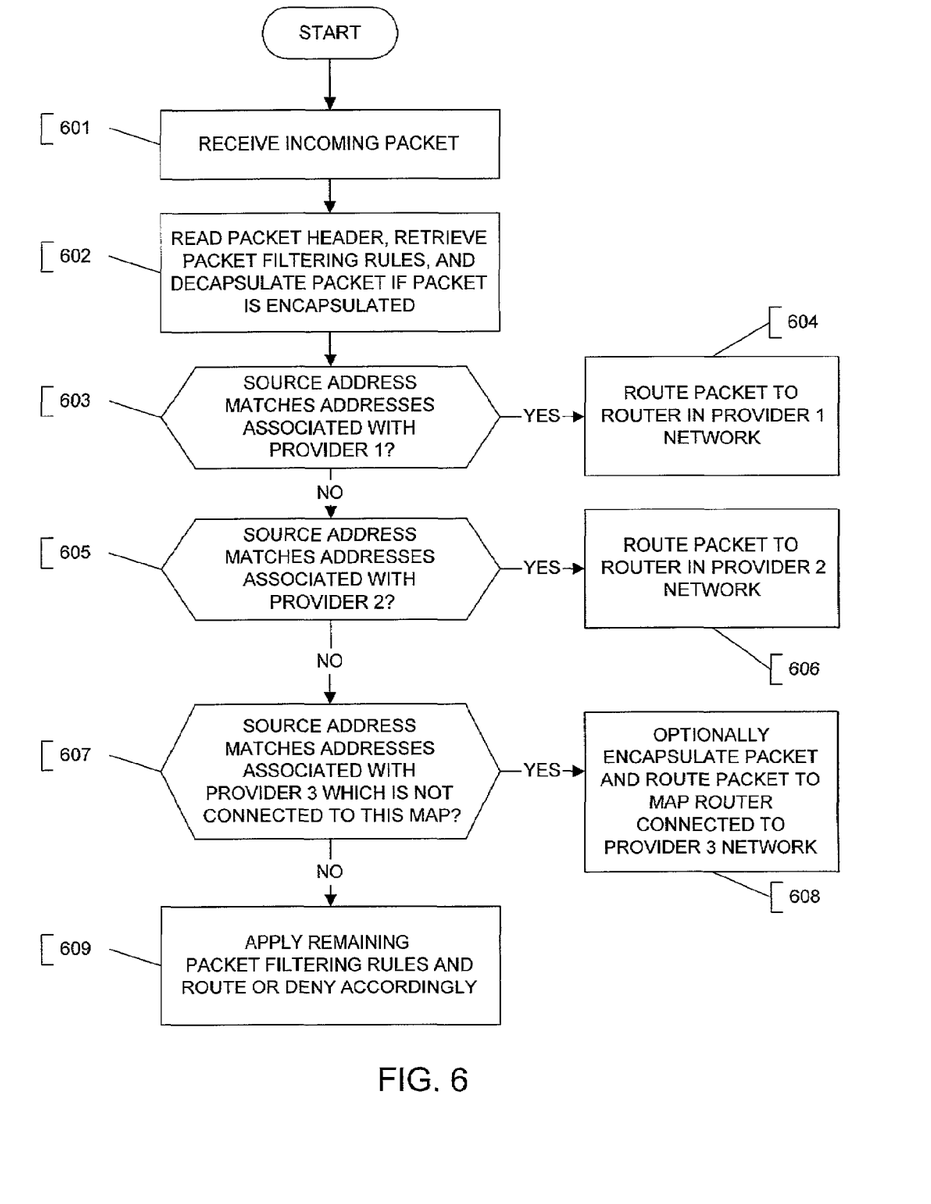
FIG. 6 is a flowchart of processing performed at a policy router acting as a managed access point, in accordance with another embodiment of the invention.

FIG. 6 sets forth a flowchart of the processing performed at a managed access point router, e.g. router 575 in FIG. 5, illustrating an embodiment of this aspect of the invention. The particular managed access point router 575 is assumed to be connected to two service networks, e.g. service networks 551 and 552 in FIG. 5, while a second managed access point router 574 provides access to a third service network, service network 553. At step 601, the router receives an incoming packet. At step 602, the router reads the packet header and retrieves the packet filtering rules, as well as decapsulates any encapsulated packets, as further described herein. At steps 603, 605, 607, and 609, the router applies the packet filtering rules. At step 603, the router compares the source IP address in the packet header to a list of addresses allocated to subscribers of services of a first service provider, e.g. operating service network 551 in FIG. 5. If the source address matches one of these addresses, then at step 604 the router forwards the packet to a router in service network 551, e.g. router 541 in FIG. 5. At step 605, the router compares the source IP address in the packet header to a list of addresses allocated to subscribers of services of a second service provider, e.g. operating service network 552 in FIG. 5. If the source IP address matches one of these addresses, then at step 606 the router forwards the packet to a router in service network 552, e.g. router 542 in FIG. 5. At step 607, the router compares the source IP address in the packet header to a list of addresses allocated to subscribers of services of a third service provider, e.g. operating service network 553 in FIG. 5, which is not connected to this particular managed access point. If the source IP address matches one of these addresses, then at step 608, the router encapsulates the packet, using any of a number of known methods for packet encapsulation, and routes the packet to a new destination address, namely the address of the managed access point with access to service network 553, i.e. managed access point router 574. Packet encapsulation is a method by which a packet may rerouted to an intermediate destination other than the destination that would be selected using normal routing procedures. See, e.g., C. Perkins, "IP Encapsulation within IP," IETF Network Working Group, RFC 2003 (October 1996); C. Perkins, "Minimal Encapsulation within IP," IETF Network Working Group, RFC 2004 (October 1996), which are incorporated by reference herein. The receiving router 574 will decapsulate the packet and route the packet, accordingly, to service network 553. The router continues in this fashion with any other packet filtering rules identifying IP addresses associated with any other service providers. Assuming the IP source address does not match any addresses associated with any other service providers, at step 609, the router applies any remaining packet filtering rules and routes or denies the packet accordingly. Note that if managed access point 575 has a direct physical connection to managed access point 574, then no encapsulation is needed. In fact, a typical configuration might include multiple port-constrained policy routers on a GIG Ethernet providing the logical managed access point function without any encapsulation. Encapsulation is only really needed to provide a logical direct connection if there is not a direct physical connection.

Packets traveling between network access devices connected to the same access network infrastructure can be forwarded directly between the devices in the access network—rather than forwarding the packets outwards to a service network and back to the same access network. This advantageously saves on bandwidth and other network resources. The only packets that need be routed to a managed access point router need be the ones for which no specific route is known internally to the access network infrastructure.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to an HFC access network architecture. However, the principles of the present invention could be readily extended to other access network architectures, such as DSL, wireless, satellite, etc. Such an extension could be readily implemented by one of ordinary skill in the art given the above disclosure.

What is claimed is:

1. A method of routing data packets in a high-speed access network infrastructure having a plurality of intermediate servers, and at least one managed access point router that interfaces with a plurality of service networks, which are external to the high-speed access network infrastructure, the method comprising:

providing the plurality of intermediate servers to route local and non-local data packets within the high-speed access network infrastructure using only destination-based packet forwarding;

providing the at least one managed access point server to receive only non-local packets from the plurality of intermediate servers and to route the non-local data packets to the plurality of service networks using only source address-based policy routing;

assigning a network address to a customer of the high-speed access network infrastructure, the network address based on a subscription of the customer to a service network, wherein the address is assigned from a list of network addresses that are dynamically allocated only to customers of the high-speed access network infrastructure that are subscribers of the service network;

receiving a local data packet from the customer at one of the plurality of intermediate servers;

forwarding the local data packet within the high-speed access network infrastructure using only destination-based packet forwarding;

receiving a non-local data packet from the customer at one of the plurality of intermediate servers;

forwarding the non-local data packet to a managed access point router using only destination-based packet forwarding;

receiving the non-local data packet at the managed access point router;

comparing a source address of the non-local data packet to the list of network addresses; and forwarding the packet to a router in the service network only when the source address matches a network address from the list.

2. The method of claim 1 wherein the source address of the non-local data packet is assigned to a network access device associated with the customer.

3. The method of claim 1 wherein the service networks utilize Internet Protocol and wherein the network addresses are Internet Protocol addresses.

4. The invention of claim 3 wherein the plurality of service networks are operated by different Internet Service Providers.

5. The invention of claim 3 wherein the plurality of service networks offer access to different Internet Protocol-based services.

6. The method of claim 3 wherein the high-speed access network infrastructure comprises a hybrid fiber coaxial network.

7. The method of claim 6 wherein the source address of the incoming packet identifies a network access device attached to the hybrid fiber coaxial network with a cable modem.

8. A method of routing data packets in a highspeed access network infrastructure having a plurality of intermediate servers, and at least one managed access point router that interfaces with a plurality of service networks, which are external to the high-speed access network infrastructure, the method comprising: providing the plurality of intermediate servers to route local and non-local data packets within the high-speed access network infrastructure using only destination-based packet forwarding;

providing the at least one managed access point server to receive only non-local packets from the plurality of intermediate servers and to route the non-local data packets to the plurality of service networks using only source address-based policy routing;

assigning separate network addresses to customers of the high-speed access network infrastructure, each network address assigned based on subscriptions of the customers to the service networks, wherein the network addresses are assigned from lists of network addresses for each of the plurality of service networks;

routing local data packets at the plurality of intermediate routers within the high-speed access network infrastructure, based only on their destination address;

routing non-local data packets from the intermediate routers to a managed access point router, based only on their destination address;

comparing the source addresses of the non-local data packets to the lists of network addresses; and routing the non-local data packets from the managed access point router to a router of a service network, based only on their source addresses, only when the source addresses match network addresses from a list of network address allocated to subscribers of the service network.

9. The method of claim 8 wherein packets between network access devices connected to the high-speed access network infrastructure are routed in the high-speed access network infrastructure using destination-based routing without being forwarded to the service network.

10. The method of claim 8 wherein the high-speed access network infrastructure provides access to local services.

11. The method of claim 10 wherein packets associated with the local services are routed in the high-speed access network infrastructure using destination-based routing without being forwarded to the service network.

12. The method of claim 8 wherein the source addresses of data packets are assigned to a network access devices associated with the subscribers of services provided by the service networks, wherein the subscribers are customers of the high speed access network infrastructure.

13. The method of claim 8 wherein the service networks utilize Internet Protocol and wherein the network addresses are internet Protocol addresses.

14. The invention of claim 13 wherein the plurality of service networks are operated by different Internet Service Providers.

15. The invention of claim 13 wherein the plurality of service networks offer access to different Internet Protocol-based services.

* * * * *